United States Patent
Watanabe et al.

(10) Patent No.: US 6,695,775 B2
(45) Date of Patent: Feb. 24, 2004

(54) LENS ASSEMBLY FOR ENDOSCOPIC LENS SYSTEM

(75) Inventors: Joji Watanabe, Saitama (JP); Kazuhiro Sakamoto, Saitama (JP); Nobuyuki Miura, Tochigi (JP); Shuichi Yamataka, Ibaraki (JP); Hiroshi Kuboya, Saitama (JP); Tadasu Kobayashi, Tokyo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 88 days.

(21) Appl. No.: 10/163,527

(22) Filed: Jun. 7, 2002

(65) Prior Publication Data

US 2002/0186478 A1 Dec. 12, 2002

(30) Foreign Application Priority Data

Jun. 7, 2001 (JP) ........................... 2001-172050

(51) Int. Cl.[7] ............... A61B 1/055; G02B 7/02
(52) U.S. Cl. ............... 600/176; 600/169; 359/513
(58) Field of Search ............... 600/101, 129, 600/133, 169, 176; 359/513, 503, 819, 811; 348/335, 340

(56) References Cited

U.S. PATENT DOCUMENTS

| | | | |
|---|---|---|---|
| 5,536,244 A | * 7/1996 | Muller et al. | 600/176 |
| 5,570,237 A | * 10/1996 | Sato | 359/797 |
| 5,894,369 A | * 4/1999 | Akiba et al. | 359/820 |
| 5,991,101 A | * 11/1999 | Holderer et al. | 359/819 |
| 6,080,101 A | * 6/2000 | Tatsuno et al. | 600/112 |
| 6,547,721 B1 | * 4/2003 | Higuma et al. | 600/133 |

FOREIGN PATENT DOCUMENTS

DE        3740417 A1 *  8/1989

* cited by examiner

*Primary Examiner*—John P. Leubecker
(74) *Attorney, Agent, or Firm*—Oblon, Spivak, McClelland, Maier & Neustadt, P.C.

(57) ABSTRACT

An optical lens assembly containing a plural number of lens elements for an optical system to be incorporated into a tip end portion of an endoscopic insertion instrument. Of a plural number of lenses which constitute an optical system, a metal film layer is formed on confronting outer peripheral surface portions of at least two adjacently located lenses, outside respective effective lens areas, and the two adjacently located lenses are assembled and fixedly bonded together by applying solder to the outer peripheral surface portions with a metal film layer.

14 Claims, 9 Drawing Sheets

LENS ASSEMBLY FOR ENDOSCOPIC LENS SYSTEM

BACKGROUND OF THE INVENTION

1. Field of the Art

This invention relates to a lens assembly which is particularly suitable for use as an optical objective lens system on an endoscopic insertion instrument.

2. Prior Art

For insertion into a body cavity, endoscopes generally have an insertion instrument which is extended out on the front side of a manipulating head assembly. An illumination means and an endoscopic observation means are incorporated into a distal end portion of the insertion instrument for endoscopic observation and examination of intracavitary sites of interest. The illumination means includes a light guide which is constituted by a bundle of fiber optics to transmit illumination light to a distal end of the insertion instrument from a light source to which an endoscope is disconnectibly connected. A light emitting end of the light guide is disposed in an illumination window which is provided on a rigid tip end section of the insertion instrument. An illumination lens is fitted in the illumination window to disperse illumination light from the light guide in a forward direction. The endoscopic observation means is provided for picking up information of an intracavitary site which is under illumination by the illumination window, and for this purpose includes an optical objective lens system. Optical images of an intracavitary site obtained through the optical objective lens system are either optically or electronically transferred to a viewing device. That is, in the case of an optical endoscope, optical images of an intracavitary site are transferred through an image guide to an eyepiece which is connected to the manipulating head assembly to permit an operator to view the optical images therethrough. In the case of an electronic endoscope, images of an intracavitary site are converted into electric signals by the use of an image sensor device and transferred to a video processor and thereby processed into video signals for display on a viewing screen.

No matter whether an endoscope is an optical type or an electronic type, its optical objective lens system of the endoscopic observation means is composed of a plural number of lens elements. A light incident end or face of a light guide is located at the focus of the optical objective lens system in the case of the optical endoscope, and an image sensor device is located at the focus of the optical objective lens system in the case of the electronic endoscope. The plural number of lens elements of the objective lens system are fitted in a lens tube or tubes of a lens assembly block to be fitted in the observation window. In aligning optical axes of the objective lens system and the light receiving face of the image guide or the image sensor device with each other, it is the general practice to fix the light receiving face in a retainer tube to be fitted and assembled with the lens tube.

In this connection, a first lens element of an objective lens system, which is located in a foremost position within a lens tube, that is, in a foremost position on the side of a subject, is usually constituted by a planoconcave lens element, with a concave side facing inward of the lens tube. Since the first lens is fitted in an exposed state on a rigid tip end section of an endoscopic insertion instrument, its exposed outer surface is often contaminated by deposition of body fluids or other contaminants which degrade observing picture images to a considerable degree. Therefore, usually a lens surface cleaner is provided on the endoscopic insertion instrument thereby to wash away contaminants from the lens surface. The lens cleaner includes a fluid nozzle which is arranged to spurt a wash fluid toward an exposed outer surface of a first lens element. A wash liquid or cleaning liquid, which is normally water, is spurted toward the outer surface of the first lens, and then compressed air is blasted on the lens surface to remove residues of the wash liquid.

In a body cavity, the first lens element which is located at the distal end of an endoscopic insertion instrument is heated almost to the same level as the body temperature of the patient, and, in the case of an electronic endoscope, heated to a higher level due to existence of a heat generating device such as solid-state image sensor device or the like. On the other hand, a lens cleaning liquid is supplied without heating, that is, a cleaning liquid of approximately ambient temperature is supplied through the lens cleaner. Therefore, the first lens element is cooled off quickly upon sprinkling a cleaning liquid on its outer surface. When the first lens element is cooled off, the inner side of the lens can be fogged by condensation of water vapor in case moisture exists within the lens tube. Besides, since the concave surface on the inner side of the first lens element is of a large curvature, the temperature drop and condensation of moisture occur conspicuously in a center portion of the lens which is far thinner than peripheral portions. Fogging even in a slight degree of a center portion of the first lens element causes considerable degradations to picture images and makes the endoscopic observation difficult because light fluxes necessary for forming images are concentrated in the center portion. A distal end portion of an endoscopic insertion instrument can be cooled off quickly due to other reasons, resulting in fogging of and condensation of moisture on the first lens element of the objective lens system.

Therefore, an optical objective lens system to be incorporated into an endoscopic insertion instrument needs to have an anti-fogging function thereby to prevent fogging or condensation of moisture on lens elements in a lens tube, particularly on a first or foremost lens element of the objective lens system. For this purpose, dry air or nitrogen gas or other moisture-free gas is sealed in the internal space of a lens tube. In addition, in order to maintain a dry state and to prevent intrusion of moisture from outside, it is necessary to seal up fitting portions of a first lens. In forming a seal of this sort, it has been known in the art to fill silicon or other adhesive in a gap space between inner periphery of the lens tube and circumferential surface of the first lens element, for example, as shown in Laid-Open Japanese Patent Application H9-234183. However, considering the severe conditions in which endoscopes are used, that is, considering repeated washing, disinfection and heated sterilization of endoscopes in use, it appears almost impossible for an adhesive or seal material to prevent moisture from creeping into a lens tube of an objective lens system over a long period of time.

In this regard, proposed in Laid-Open Japanese Patent Application 2000-193892 is An air-tight structure which is formed by soldering together a lens tube and a first lens element of an optical objective lens system. In this case, as compared with an adhesive or seal material, the use of metal solder makes it possible to form an extremely sturdy air-tight structure. In addition, because of freedom from drops in air-tightness over a long period of time, it can securely prevent moisture from creeping into the lens tube from outside through the fitting mount portion of the first lens. In this connection, since the lens tube is formed of a metal, solder can be easily applied thereto. However, on the part of the lens element of glass, solder can be easily detached from the lens element if applied directly on a glass surface. Therefore, in order to prevent this, a soldering lens surfaces need to be metalized before applying solder thereto.

The air-tight structure by soldering is advantageous because it can maintain air-tightness stably over a long period of time. However, due to a difference in thermal expansion rate between metal and glass, detachment of solder or damages to lens elements may occur, for example, when the endoscopic insertion instrument is heated in an autoclave for sterilization. For this reason, it is undesirable to solder a circumferential surface of a lens element to an inner peripheral surface of a lens tube.

In the case of the above-mentioned air-tight structure by prior art, an annular lens mount wall is projected on and around the inner periphery of a lens tube, and a lens element is set in position on the lens tube by abutting same against an lens mount surface on one side of the annular wall and then soldered to the latter. In this case, a clearance corresponding to a difference in thermal expansion rate is provided between circumferential surface of the lens element and inner periphery of the lens tube. This however makes it difficult to align the optical axis of the first lens element with that of the lens tube and other lens elements of the objective lens system. Besides, air-tightness seal between the first lens and the lens tube is effective for blocking intrusion of air from front side but not effective for blocking air from back side of the first lens element or from inside of an insertion instrument. Therefore, if moistened air exists within the insertion instrument, it can result in condensation of water vapor on the back side of the first lens element. Normally, an endoscopic insertion instrument as a whole is not hermetically sealed in a moisture-proof state, so that it is difficult to maintain a completely moisture-free dry atmosphere within the insertion instrument. As a consequence, it is usually the case that the inside of a lens tube can be kept in a completely moisture-free state only a limited period of time.

SUMMARY OF THE INVENTION

It is an object of the present invention to provide a lens assembly suitable for an endoscopic optical objective lens system, having spaces between adjacent lens elements of the system hermetically sealed in a reliable manner.

It is another object of the present invention to provide a lens assembly suitable for an endoscopic objective lens system, having spaces between adjacent lens elements hermetically sealed in such a way as to prevent intrusion of moisture over a long period of time.

It is still another object of the present invention to provide a lens assembly suitable for an endoscopic objective lens system, which can prevent condensation of water vapor on an inner surface of a first or foremost lens element of the system.

It is a further object of the present invention to provide a lens assembly suitable for an endoscopic objective lens system, having an air space between first and second lens elements of the system hermetically sealed in a reliable manner.

According to the present invention, in order to achieve the above-stated objectives, there is provided a lens assembly for an endoscopic optical lens system to be incorporated into a distal end portion of an endoscopic insertion instrument, the lens assembly comprising: metal film layers formed on and around confronting outer peripheral surface portions, outside effective lens areas, of at least two adjacently located lens elements of the optical lens system; and solder applied to and between the metal film layers to bond said adjacently located lens elements fixedly to each other in a hermetically sealed state.

From the standpoint of preventing fogging, it is important to prevent condensation of water vapor on an inner surface of a first lens element which is located in a foremost position, on the side of a subject, among a plural number of lens elements which constitute an endoscopic optical lens system. Therefore, above all, an air space between a first lens in a foremost position and a second lens in a second foremost position of a lens system is hermetically sealed by the use of solder which fixedly bonds the first and second lenses together. In order to enhance the bonding strength by solder, metal film layers are formed on confronting outer peripheral surfaces, outside effective lens areas, of the first and second lenses. The metal film layers can be formed, for example, by an evaporation process. However, in order to form the metal film layers by a simpler method; it is desirable to employ a metal plating process. More specifically, the metal film layers can be formed by electroless nickel plating, followed by electroless gold plating.

In soldering lens elements together, a flux can be filled into a joint portion for the purpose of distributing solder more positively. If a flux is charged directly between metal film layers of two adjoining lens elements, it may get as far as an air space between the two lens elements. In order to avoid this, it is preferred to form a seal around the joint portion between two lens elements by applying an adhesive at the time of assembling and adjusting the optical axes of the two lens elements into alignment with each other. The use of an adhesive in this way contributes to fix the two lens elements temporarily to each other prior to soldering, and to form a seal or shield portion on the inner side of a joint portion to block intrusion of solder and flux.

In this connection, in assembling the first and second lenses of an optical lens system, two lens elements are either directly bonded to each other or indirectly bonded to each other through a spacer member. In the former case, a V-groove is formed between confronting outer peripheral surfaces outside of effective lens areas of the respective lenses to be joined, and solder is applied to the V-groove to fix the two to each other. In the latter case, that is, in a case where an annular spacer member is interposed between first and second leases, a V-groove is formed on each side of the spacer member, that is, between the first lens and the spacer member and between the second lens and the spacer member, and solder is applied to each V-groove to bond the first and second lenses fixedly to each other through the spacer member. In the latter case, in order to distribute solder to each side of the spacer member, it is desirable to provide notched portions at outer peripheral edges of the spacer member or to perforate a number of holes in the spacer member. Preferably, an adhesive is applied between the first and second lenses before soldering to fix the two lenses temporarily in an aligned state and to form a seal or shield in and around bottom portions of the V-groove block solder and flux which might otherwise intrude into an air space between the first and second lenses. In a case where an endoscopic objective lens system is constituted by three or more lens elements, similarly a third or other additional lens elements can be soldered to the first and second lenses which are assembled by the use of solder in the manner as described above. Furthermore, the lens assembly according to the present invention can be similarly applied to an illumination lens system which is composed of a plural number of optical lens elements.

The above and other objects, features and advantages of the present invention will become apparent from the following particular description, taken in conjunction with the accompanying drawings which show by way of example preferred embodiments of the invention. Needless to say, the present invention should not be construed as being limited particular forms shown in the drawings.

DESCRIPTION OF PREFERRED EMBODIMENTS

Figure 1:
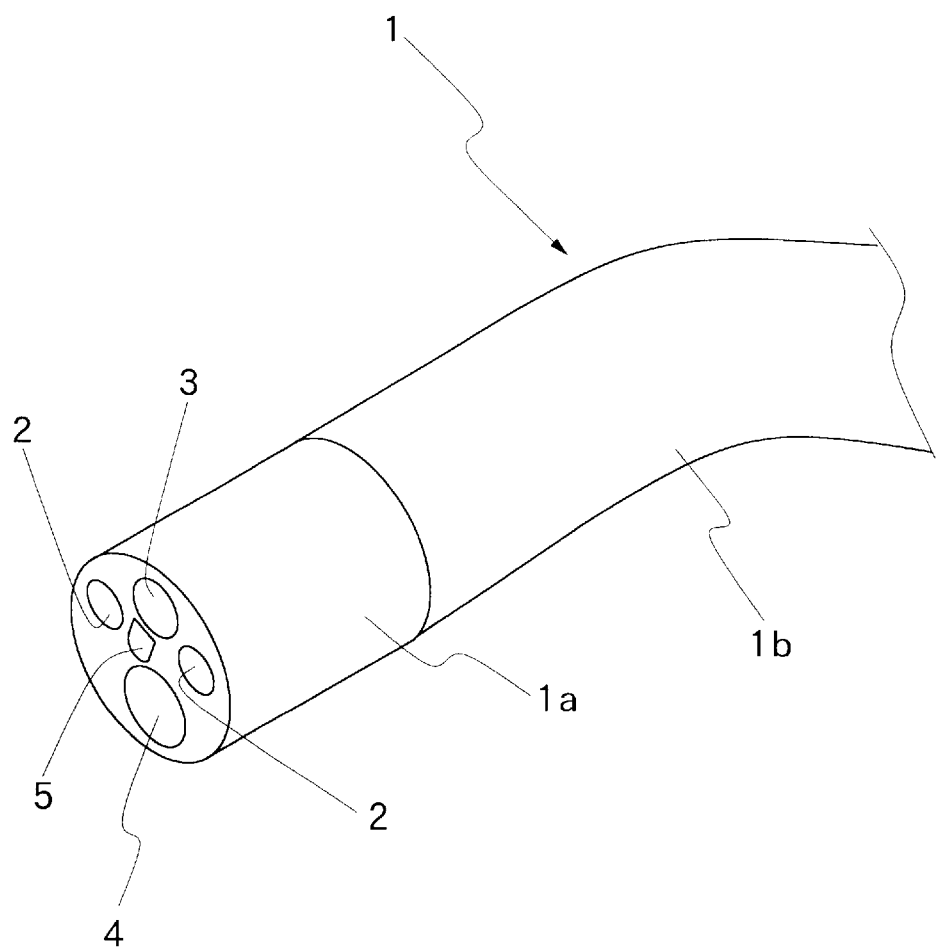
FIG. 1 is a schematic outer view of a tip end portion of an endoscopic insertion instrument.

Hereafter, the present invention is described more particularly by way of its preferred embodiments with reference to the accompanying drawings. Firstly, shown schematically in FIG. 1 is a tip end portion of an endoscopic insertion instrument. In this figure, indicated at 1 is an insertion instrument to be introduced into a body cavity. At the fore distal end, the insertion instrument 1 is provided with a rigid tip end section 1a having a rigid structure for supporting endoscopic observation and illumination means thereon. Through an angle section 1b of a predetermined axial length, the proximal end of the rigid tip end section 1a is connected to an elongated flexible main body, which is connected to a manipulating head assembly of the endoscope although not shown in the drawings. The angle section 1b is provided for turning the rigid tip end section 1a into a desired direction. Opened in a fore end face of a casing of the rigid tip end section 1a are an illumination window 2 and an observation window 3 along with an exit opening of a biopsy channel 4 which is provided in the endoscopic insertion instrument for insertion of forceps or other biopsy or surgical instruments. Further, a cleaner nozzle 5 is provided on the casing of the rigid tip end section 1a for spurting a cleaning fluid, for example, a mixture of cleaning water and compressed air toward the observation window 3.

Figure 2:
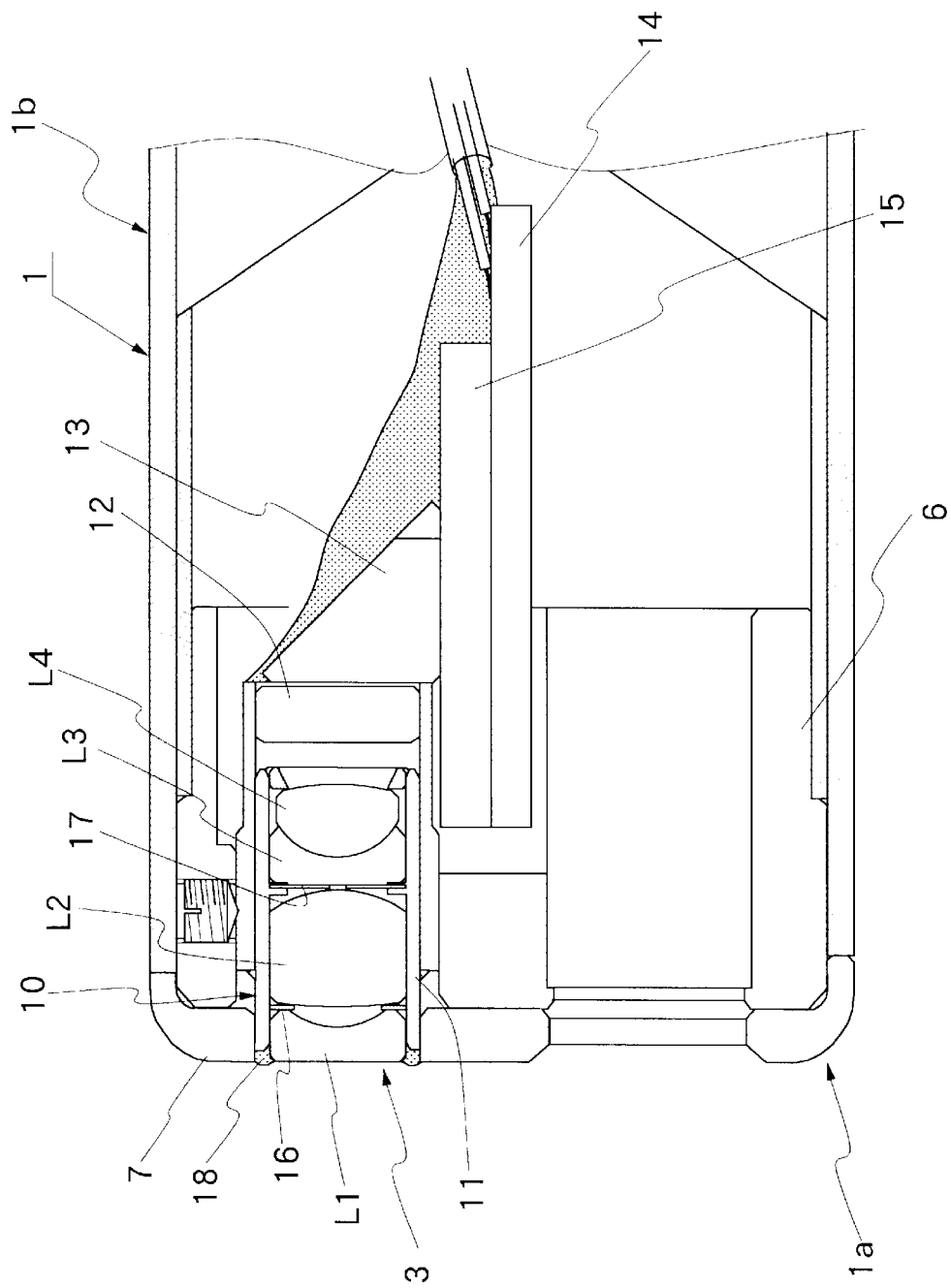
FIG. 2 is a schematic sectional view of the tip end portion, taken through an endoscopic image pickup assembly including an objective lens system embodying the present invention.

As shown in FIG. 2, the rigid tip end section 1a is constituted by a rigid casing structure 6 and an end cap 7. In order to cope with the necessity for opening a plural number of axial bores by complicate machining operations, the casing 6 is normally constituted by a rigid metal structure of high strength. The end cap 7 is formed of an electrically insulating material and fitted on the rigid casing structure 6 to cover up a metal part which would otherwise exposed to the outside. Joint portion of the rigid casing 6 and the end cap 7 is sealed with a seal material. An image pickup assembly unit 10 which is located in the observation window 3 consists of a lens tube 11 and an objective lens system which is assembled into the lens tube 11. An axial bore is formed through the end cap 7 and the rigid casing 6 for the purpose of fixing the lens tube in position on the rigid casing 6. A filter 12 is fitted on the lens tube 11 at a position on the image-forming side of the objective lens system, and a prism 13 is cemented to a posterior end face of the lens tube 11 thereby to turn the optical axis of the objective lens system through 90 degrees. In turn, cemented to the lower side of the prism 13 is an image sensor means, more particularly, a solid-state image sensor device 15 which is mounted on a wiring substrate board 14.

Figure 3:
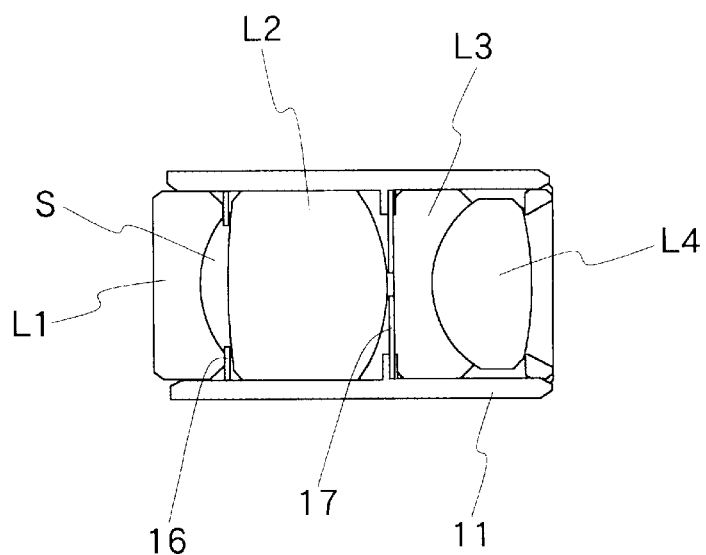
FIG. 3 is a schematic sectional view explanatory of the construction of the objective lens system.

Shown in FIG. 3 is an example of objective lens construction, which is provided in the lens tube 11. In the case of the particular example shown, the objective lens system is composed of four lens elements L1, L2, L3 and L4. The first lens L1 is a planoconcave lens having a flat lens surface on the side of the subject and a concave lens surface on the image-forming side. The first lens L1 is fitted in the observation window 3 with its flat surface exposed to the outside. The second lens L2 is a planoconvex lens L2 which is located next to the first lens L1 is a planoconvex lens. Further, the third lens L3 is a planoconcave lens having a concave surface on the image-forming side, and the fourth lens L4 is a convex lens. Interposed between the first lens L1 and the second lens L2 is a spacer 16, an annular plate of a predetermined width, thereby to block harmful light rays. Further, a stop 17 is interposed between the second and third lenses L2 and L3, and the third and fourth lenses L3 and L4 are in the form of a cemented lens.

The image pickup assembly unit 10 is mounted on the rigid tip end section 1a, with the lens tube 11 fitted in an bore which is formed axially through the rigid casing 6 and the end cap 7. The front surface of the first lens L1 of the objective lens system is positioned substantially flush with or in a slightly projected state with respect to the front face of the end cap 7. The first lens L1 so mounted as to slightly protrude on the front side of the lens tube, so that an annular groove is formed between the end cap 11 and the circumference of the first lens L1. Seal material 18 is filled in this annular groove to seal up the circumference of the front end of the image pickup assembly unit 10.

As clear from FIG. 3, an air space S exists between the first and second lenses L1 and L2 of the objective lens system. If the air space S contains moisture, it may results in condensation of water vapor on lens surfaces, particularly on an inner surface of the first lens L1 which is exposed to the outside through the observation window 3 and sprinkled with cleaning water from time to time to wash away contaminants from its front surface. Upon sprinkling cleaning water, thin center portions of the first lens L1 are quickly cooled down to invite condensation of water vapor on inner surfaces of the thin center portions. As explained hereinbefore, the concentrated water condensation on center portions of the first lens L1 makes it difficult to obtain clear images. Therefore, it is an utmost importance to seal the air space S between the first and second lenses L1 and L2 completely in such a way as to shield off moisture over a long period of time.

Figure 4:
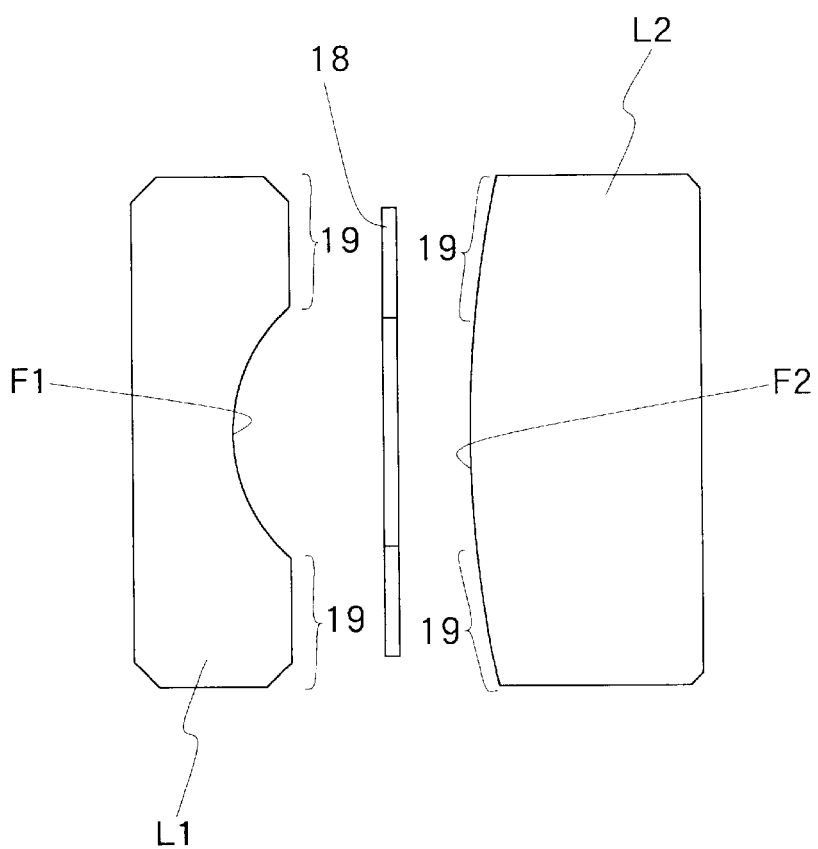
FIG. 4 is a schematic illustration showing plated regions on first and second lens elements of the objective lens system.

In this regard, the inner surface F1 of the first lens L1 is a concave surface as shown particularly in FIG. 4, but its concavely curved portion exists only in a limited area, that is, only in a predetermined center region including its optical axis. The lens L1 has flat surfaces in outer peripheral areas radially outward of the concavely curved lens portion, and outer peripheral edges are chamfered with an obliquely cut surface. Thus, only the concavely curved surface is an effective surface area as a lens, and no light flux is passed through other flat and obliquely cut surfaces of the lens in forming an image. Further, the second lens L2 has a convex surface on its entire surface area F2 on the side of the subject, but its effective surface area is limited to a portion which confronts the concavely curved surface of the first lens L2. The reason why the annular space member 16 is interposed is to prevent light flux from getting outside the effective lens portion or to form a predetermined gap space between the first and second lenses L1 and L2. A metal film layer 19 is formed on the front surface F1 of the first lens L1 as well as on the front surface F1 of the second lens L2, except the respective effective lens portions.

The metal film layer 19 can be formed, for example, by evaporation, but from the standpoint of production cost, it is more preferable to form it by metal plating. For plating the metal film layer 19, lens elements are immersed in a plating after masking non-plating areas. In this regard, lens elements are immersed in a plating bath of a relatively low temperature in the case of metal plating as compared with an evaporation process, so that the masking is almost free of the question of heat resistance. Namely, for example, lens elements can be masked by bonding adhesive seals or applying rubber-base masking agent or the like, without a trouble of defoliation in the course of plating. Further, it is an inevitable requisite to provide a high vacuum atmosphere in the case of an evaporation process. In contrast, in the case of metal plating which is a non-directional wet process, there is no need for providing a vacuum atmosphere or for turning lens elements. Namely, in consideration of simplicity of production equipments, it is far more advantageous to employ plating for forming the metal film layers 19 on the first and second lenses L1 and L2.

Figure 5:
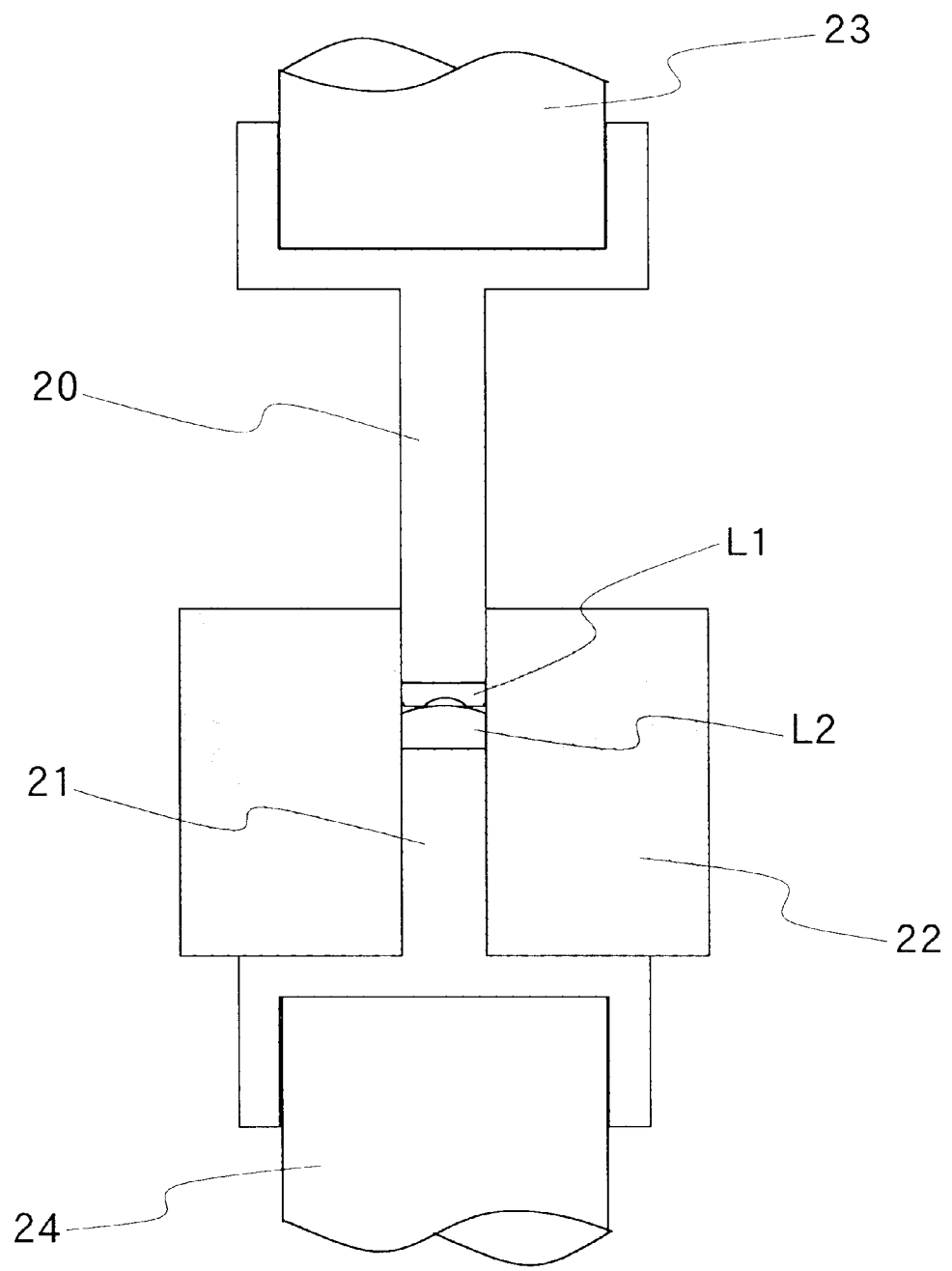
FIG. 5 is a schematic illustration showing a jig for aligning optical axes of the first and second lens elements.

After forming the metal film layers 19 as described above, the first and second lenses L1 and L2 are joined and cemented to each other through the spacer member. At the time of joining the lenses L1 and L2, it is necessary to adjust the optical axes of the two lenses precisely into alignment with each other. For this purpose, for example, the two lenses can be cemented by the use of a lens cementing apparatus as shown in FIG. 5. More specifically, as seen in the drawing, the lens cementing apparatus employs a pair of positioning pins 20 and 21 and a drum 22 having a guide bore of a diameter corresponding to the outside diameter of the cementing lenses L1 and L2 and adapted to hold the two lenses L1 and L2 in an aligned state. The above-mentioned positioning pins 20 and 21 are connected to micrometer heads 23 and 24, respectively.

One of the paired positioning pins 20 and 21 is fixedly provided on a stationary side, while the other positioning pin is supported on a movable member for movements toward and away from the stationary positioning pin. For instance, in the case of FIG. 5, the lower positioning pin 21 of a shorter length is supported on a stationary side, while the upper positioning pin 20 of a greater length is supported on a movable side. Initially, the micrometer heads 34 and 24 are separated away from each other, with the lower positioning pin 21 in fitting engagement with the guide bore in the drum 22 with its upper end face located internally of the guide bore. In this state, first and second lenses L1 and L2 are dropped on the upper end face of the lower positioning pin 21 within the drum 22. A spacer member 16 is also dropped into the guide bore in case it is to be interposed between the first and second lenses L1 and L2.

As a first lens L1 is dropped into the guide bore in the drum 22, its end face is abutted and seated on the lower positioning pin 21, in contact with the inner wall surface of the guide bore which restricts radial deviations of the lens L1. In the next place, a second lens L2 is dropped into the guide bore of the drum 22 also in a radially restricted state to lie on the first lens L1. In this state, the first and second lenses L1 and L2 are pressed to each other by the upper and lower positioning pins 20 and 21 to join the two lenses in an aligned state. Then, the positions of the positioning pins 20 and 21 are reversed, that is to say, the positioning pins 20 and 21 are turned upside down, whereupon the drum 22 is allowed to slide onto the positioning pin 20 from the shorter positioning pin 21 and rest on shoulder portions of the positioning pin 20. Since the positioning pin 20 is longer than the drum 22, the first and second lenses L1 and L2 which are gripped between the two positioning pins 20 and 21 come are popped up from the guide bore with the outer peripheries of the respective lenses in a free state as soon as the drum 22 is relocated onto the longer positioning pin 20.

Figure 6:
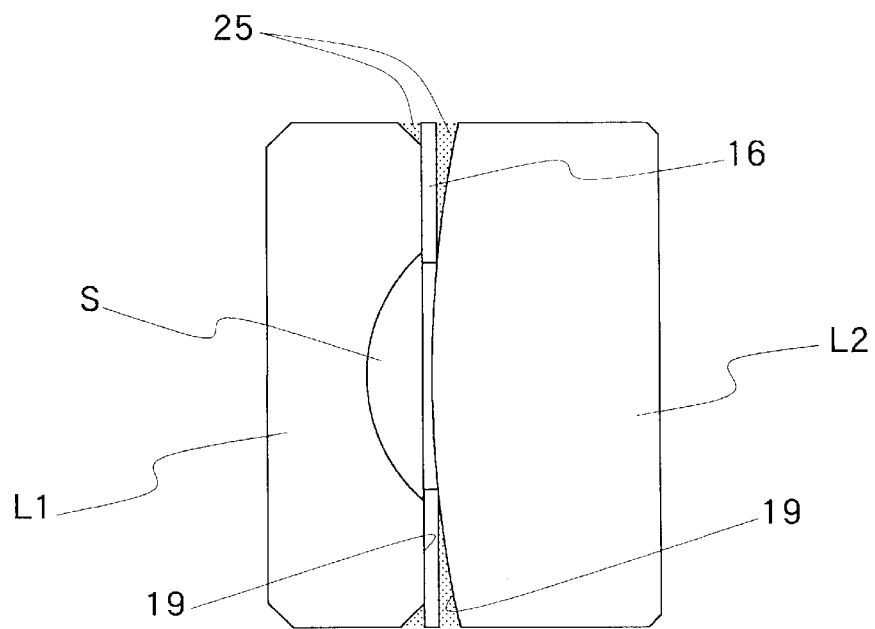
FIG. 6 is a schematic illustration showing the first and second lens elements in an assembled state.

Since the first and second lenses L1 and L2 are joined together, a V-groove is formed around and between outer peripheries of the two lenses, outside effective lens area of the respective lenses. Therefore, a cream solder is charged into the V-groove to cement the two lenses to each other. As a result, as shown in FIG. 6, the first and second lenses L1 and L2 having the respective optical axes in an aligned state are securely cemented to each other by the solder which is applied to and around entire outer peripheral portions of the lenses. Thus, an air space S between the first and second lenses L1 and L2 is completely sealed up by the solder. At the time of assembling the cemented first and second lenses L1 and L2 into a lens tube, there is no need for aligning their optical axes because they were already in aligned with each other in a preceding stage, and it suffice to align the optical axes of the first and second lenses with other lenses of an objective lens system. Namely, the lenses of an objective lens system can be assembled into a lens tube more easily with the optical axes of the respective lenses in a precisely aligned state.

Figure 7:
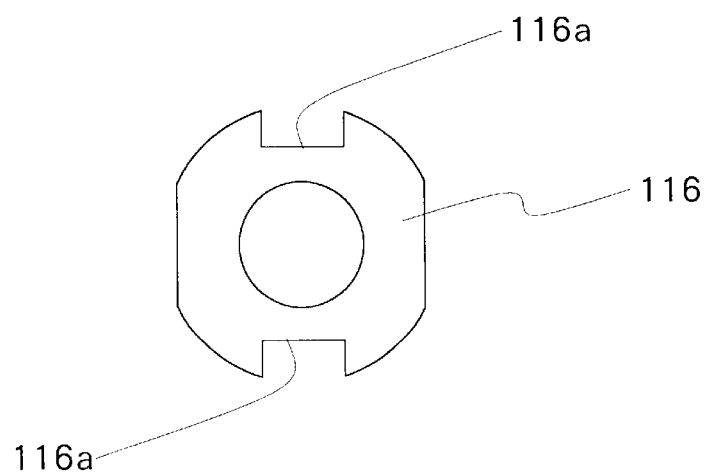
FIG. 7 is a schematic illustration showing a spacer member to be interposed between the first and second lens elements.
Figure 8:
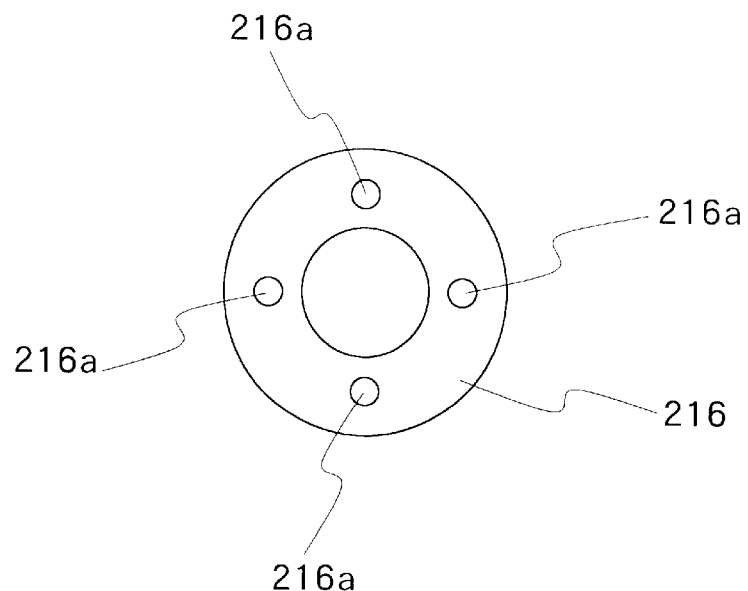
FIG. 8 is a schematic illustration showing another example of spacer member, which is different from the one shown in FIG. 7.

In this instance, the solder should be uniformly applied around and between the entire outer peripheries of the first and second lenses L1 and L2. In case the spacer 16 is interposed between the two lenses, the solder should also be applied to get onto both the front and rear sides of the spacer member. In the case of the example which is shown in FIG. 4, the spacer member 16 is smaller in outside diameter than the first and second lenses L1 and L2, so that applied solder can be distributed onto the opposite sides of the spacer member 16. However, in aligning optical axes of the spacer member and the first and second lenses L1 and L2, it is considered easier and more convenient to align the optical axes in reference to outside diameter. In such a case, the spacer member 16 needs to be formed in the same outside diameter as the first and second lenses L1 and L2, and it becomes necessary to provide means for distributing solder. For this purpose, there may be employed either a spacer member 116 which is formed with notches on upper and lower sides of its outer periphery as shown in FIG. 7, or a spacer member 216 which is perforated with a plural number of through holes 216 as shown in FIG. 8. In each one of these modifications, the spacer member 116 or 216 contains at least partly arcs which conform with the outside diameter of the first and second lenses L1 and L2.

The above-described soldering operation is carried out in a dry atmosphere to keep the air space S between the first and second lenses L1 and L2 completely free of moisture. Since the air space S is completely shielded by the metal of the solder 25 there is almost no possibility of moisture creeping into the air space S to cause fogging of lens surface during use of an endoscope over a long period of time.

Besides, the joining surfaces of the first and second lenses L1 and L2 are surfaces which face toward each other through the solder, so that there is little possibility of the solder getting detached from lens surfaces when heat is applied to the lens tube and objective lens system of the endoscope for heated sterilization or for other purposes. Further, since the lenses are not soldered to the inner periphery of a lens tube, they are also free from cracking or other damages which might otherwise be caused thereto by imposition of large stress at the time of heated sterilization due to a difference in thermal expansion rate. Furthermore, since a hermetic seal is formed only around a small air space S between the first and second lenses L1 and L2, it is unlikely that the internal pressure of a lens tube is varied largely by expansion of air which occurs on a temperature rise particularly in a case in which a lens tube as a whole is retained in a hermetically sealed state. That is to say, a higher hermetic seal can be formed between lenses.

In the particular embodiment shown, the spacer member 16 is interposed between the first and second lenses L1 and L2. As described above, the metal film layer 19 is plated on the joining lens surfaces outside the effective lens areas of the respective lenses. In this instance, it is possible to employ metal plating of black color. Therefore, in addition to the function of enhancing bondage of solder, the metal film layer 19 can perform a function as an anti-reflection coating on outer edge portion and cementing outer surface portions of the lenses. For this purpose, at the time of metal plating, palladium suboxide is deposited on the plating lens surface as a reaction catalyst. Palladium suboxide contributes to augment the strength of plating, and it is oxidized into palladium oxide ($PdO_2$) of black color when a metal film is formed in the course of the plating process. It follows that, in this case, there is no necessity for interposing a shield plate for blocking harmful light or for separately forming an anti-reflection coating.

Figure 9:
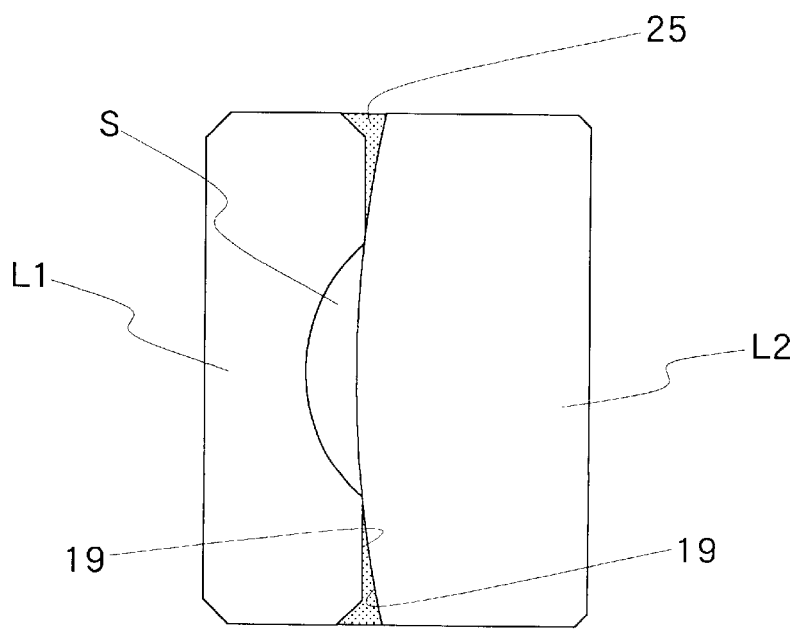
FIG. 9 is a schematic illustration showing in assembled state first and second lens elements which are of a different type from the first and second lens elements shown in FIG. 6.
Figure 10:
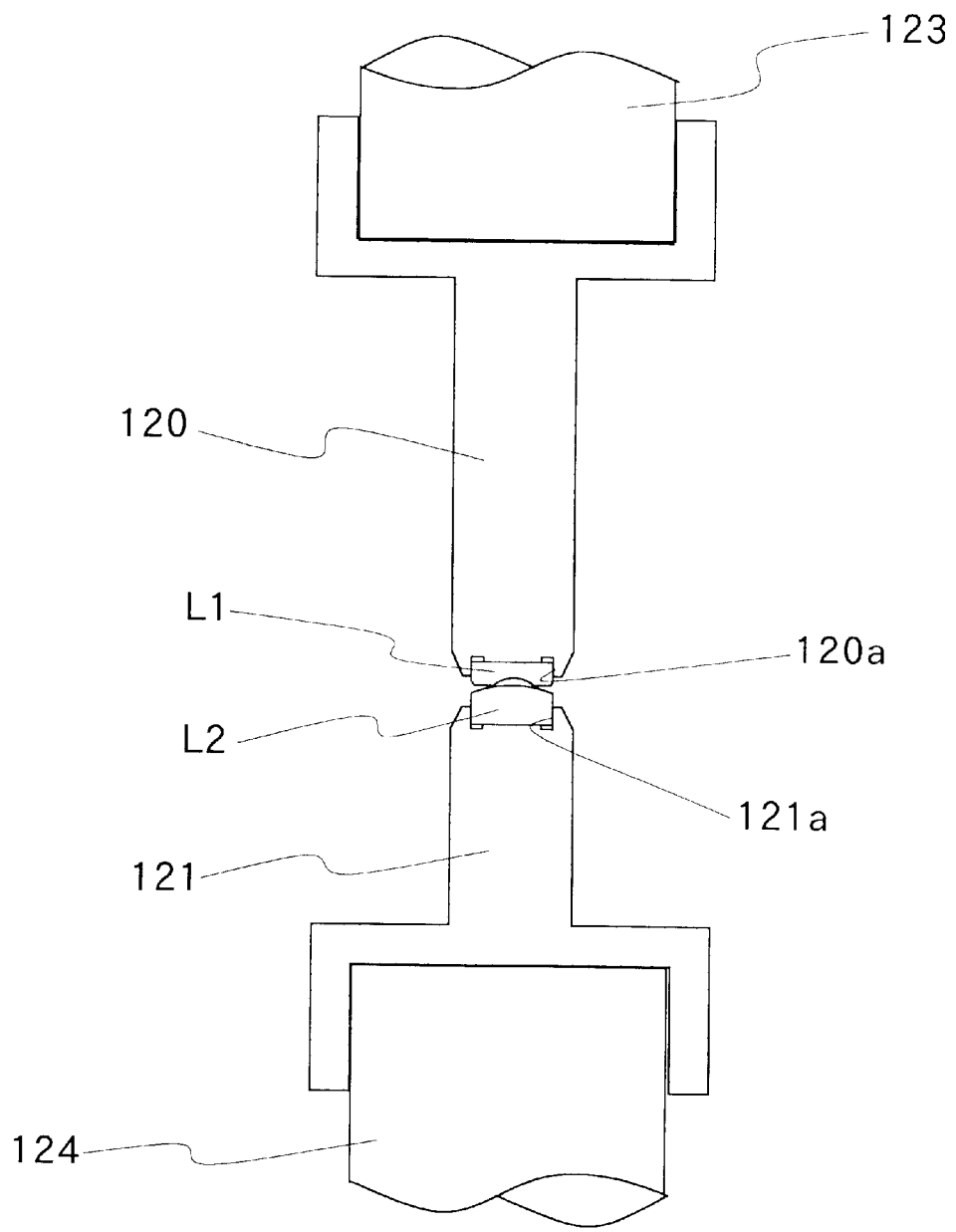
FIG. 10 is a schematic illustration showing a jig for aligning optical axes of the first and second lens elements, which is different in construction from the jig shown in FIG. 5.

Particularly, in a case where the metal plating is utilized also as an anti-reflection coating, the first and second lenses L1 and L2 can be directly cemented and assembled together without interposing anything therebetween as shown in FIG. 9. In such a case, the optical axes of the first and second lenses L1 and L2 can be brought into alignment with each other by the use of a jig as shown in FIG. 10. More specifically, as seen in that figure, the first and second lenses L1 and L2 are held in chuck members 120a and 121a at the distal ends of positioning rods 120 and 121 which are connected to micrometer heads 123 and 124, respectively. In this case, the optical axes of the first and second lenses L1 and L2 can be brought into alignment with each other by the positioning rods 120 and 121, with the outer peripheral surfaces of the respective lenses in an exposed state.

Figure 11:
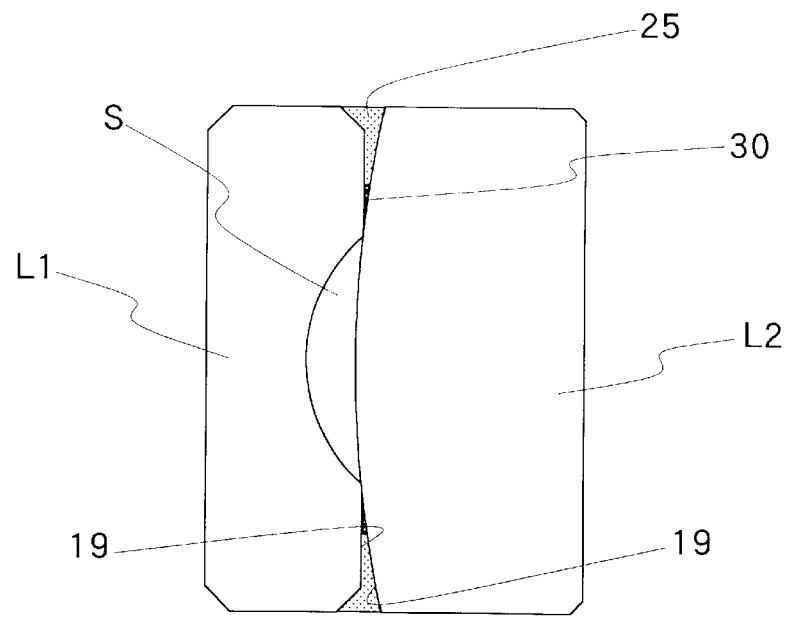
FIG. 11 is a schematic illustration of assembled first and second lens elements which are soldered in position after applying an adhesive on abutting surfaces of the lens elements.

In this connection, no matter whether the first and second lenses are aligned by the use of the jig of FIG. 10 or by the use of other jig, it is desirable that the two lenses be temporarily bonded to each other to permit to perform a soldering operation smoothly. In addition, for the purpose of ensuring smooth distribution of the solder, it is also desirable to fill a flux in the annular V-groove between outer peripheral portions of the two lenses. In this case, however, it is necessary to block the flux (or the solder) off the air space S between the first and second lenses L1 and L2. For this purpose, after aligning optical axes and joining the first and second lenses L1 and L2, an adhesive 30 is applied all around bottom portions (inner peripheral portions) of the annular circumferential groove between the two lenses L1 and L2 as shown in FIG. 11. After sealing bottom portions of the circumferential groove between the two lenses L1 and L2 with the adhesive 30 in this manner, solder 25 is charged into the groove. In this case, the aligned first and second lenses L1 and L2 can be fixedly bonded to each other by the adhesive 30, the soldering can be carried out in a separate stage, if desired. Besides, since in this case a hermetical seal is already formed between the two lenses L1 and L2 by the adhesive 30, there is no need for pressing the two lenses L1 and L2 strongly to each other to prevent intrusion of the solder and flux into the air space S. In a case where the spacer member 18 is interposed between the first and second lenses L1 and L2, it is desirable to apply an adhesive on contacting surfaces of the spacer member 18 and the lenses L1 and L2 thereby to obtain a lens assembly having the respective components fixed in aligned positions and at the same time to form a hermetical seal around the air space S to prevent intrusion of the solder and flux.

Figure 12:
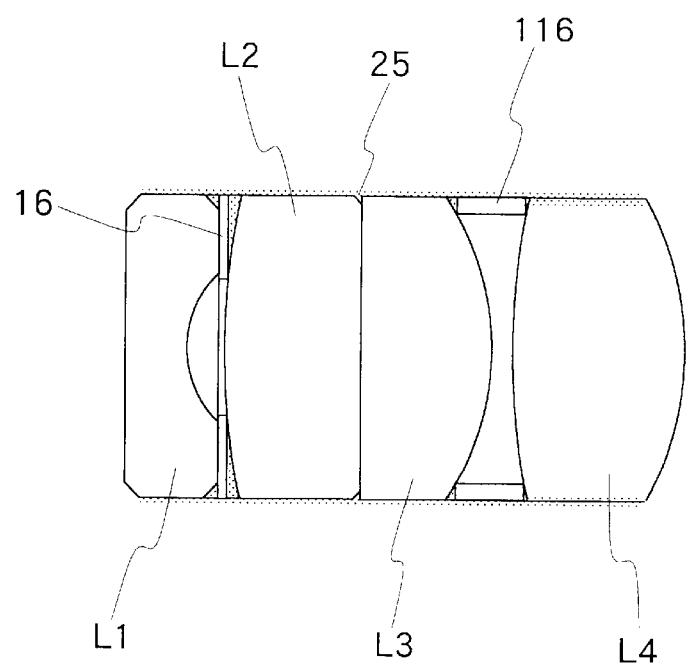
FIG. 12 is a schematic illustration of an objective lens system having its lens elements assembled without using a lens tube.

In a case where an optical objective lens system contains three or more lens elements, all of the lens elements of the objective lens system can be assembled and fixed to each other by the use of the solder 25 as shown particularly in FIG. 12. In this case, a metal film layer is formed on outer peripheral surfaces of the third and fourth lenses L3 and L4. Firstly, the first and second lenses L1 and L2 are soldered together in the same manner as described hereinbefore. After soldering the first and second lenses L1 and L2, the optical axis of the third lens L3 is aligned with that of the second lens L2, and then the fourth lens L4 is assembled in alignment therewith. Then, solder is applied to outer peripheral portions of the respective lenses to securely fix all of the lenses together. Thus, in this case, an objective lens system can be assembled into an endoscopic insertion instrument without using a lens tube if desired. This is a great advantage because the diameter of an endoscopic insertion can be reduced by omission of a lens tube.

Figure 13:
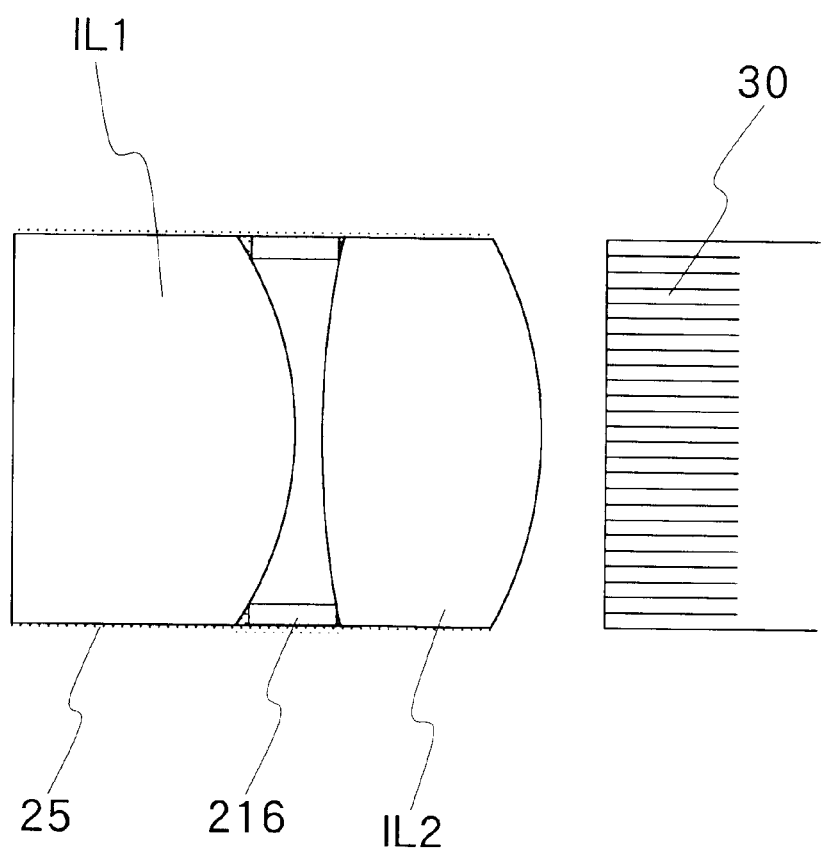
FIG. 13 is a schematic illustration of a lens device according to the present invention, which is applied as an illumination lens system.

In addition to an objective lens system, an endoscopic insertion instrument is normally provided with another optical lens system for illumination purposes. In the connection, shown in FIG. 13 is an illumination lens system having a diffuser lens located in front of a light emitting end of a light guide as an illumination lens. In case an illumination lens system is constituted by two or more lens elements, for example, a first lens IL1 and a second lens IL2, and a spacer member 216 as in the particular example shown, the respective lenses IL1 and IL2 and the spacer member 216 can be similarly assembled and fixed together by applying solder all over their circumferential surfaces as indicated at 25.

What is claimed is:

1. A lens assembly for an endoscopic optical lens system to be incorporated into a distal end portion of an endoscopic insertion instrument, said lens assembly comprising:
   metal film layers formed on and around confronting outer peripheral surface portions, outside effective lens areas, of at least two adjacently located lens elements of said optical lens system; and
   solder applied to and between said metal film layers to bond said adjacently located lens elements fixedly to each other in a hermetically sealed state.

2. A lens assembly for an endoscopic optical lens system as defined in claim 1, wherein said adjacently located lens elements are abutted against each other in such a way as to form a V-groove along and between confronting outer peripheral surface portions with said metal film layers, and an adhesive is applied to and around bottom portions of said V-groove to form an annular shield for blocking said solder off said effective lens areas.

3. A lens assembly for an endoscopic optical lens system as defined in claim 1, wherein said adjacently located lens elements are first and second lenses in a foremost and a second foremost position of an endoscopic objective lens system, from the side of a subject.

4. A lens assembly for an endoscopic optical lens system as defined in claim 3, wherein said first lens is a planoconcave lens having on a subject side a flat surface and on an image-forming side a concave surface as an effective lens area bounded on the outer peripheral side thereof by a flat adjoining surface having outer peripheral edges chamfered with an obliquely inclined surface, and said second lens is a planoconvex lens having a flat surface or a convex surface on the front side or on the side of said first lens.

5. A lens assembly for an endoscopic optical lens system as defined in claim 3, wherein said first and second lenses are assembled and held in abutting engagement with each other in such a way as to form a V-groove between and along outer peripheries thereof, and securely bonded to each other by soldering said V-groove.

6. A lens assembly for an endoscopic optical lens system as defined in claim 3, wherein an annular spacer member is interposed between said first and second lenses, and said spacer member and first and second lenses are assembled and fixedly bonded together by apply solder to a V-groove on each side of said spacer member.

7. A lens assembly for an endoscopic optical lens system as defined in claim 6, wherein said spacer member is constituted by a light shielding plate.

8. A lens assembly for an endoscopic optical lens system as defined in claim 6, wherein said spacer member is provided with solder distributing portions to distribute solder from a groove on the side of said first lens to a groove on the side of said second lens or vice versa.

9. A lens assembly for an endoscopic optical lens system as defined in claim 6, wherein said spacer member is bonded to said first and second lenses by the use of an adhesive in such a way as to seal bottom portions of said V-groove on each side of said spacer member before applying solder thereto.

10. A lens assembly for an endoscopic optical lens system as defined in claim 3, wherein said objective lens system is constituted by three or more lens elements, and has the respective lens elements assembled and fixedly bonded together by soldering outer peripheral portions of said lens elements.

11. A lens assembly for an endoscopic optical lens system as defined in claim 1, wherein said plural number of lens elements are assembled and fixedly bonded together to serve as an endoscopic illumination lens system.

12. A lens assembly for an endoscopic optical lens system as defined in claim 1, wherein said metal film layer is arranged to have a light shielding function.

13. A lens assembly for an endoscopic optical lens system as defined in claim 1, wherein said metal film layer is plated on said lens surfaces.

14. A lens assembly for an endoscopic optical lens system as defined in claim 13, wherein plated metal film layer contains palladium suboxide.

* * * * *